United States Patent
Cavanaugh et al.

(10) Patent No.: US 12,301,047 B2
(45) Date of Patent: *May 13, 2025

(54) SECONDARY POWER SYSTEM

(71) Applicant: Volta Power Systems, L.L.C., Holland, MI (US)

(72) Inventors: Bill Cavanaugh, Holland, MI (US); Jack Johnson, Holland, MI (US)

(73) Assignee: Volta Power Systems, L.L.C., Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/394,732

(22) Filed: Dec. 22, 2023

(65) Prior Publication Data

US 2024/0128787 A1  Apr. 18, 2024

Related U.S. Application Data

(63) Continuation of application No. 17/328,659, filed on May 24, 2021, now Pat. No. 11,855,478, which is a
(Continued)

(51) Int. Cl.
*B60L 11/16* (2006.01)
*B60R 16/033* (2006.01)
(Continued)

(52) U.S. Cl.
CPC ............. *H02J 7/14* (2013.01); *B60R 16/033* (2013.01); *H02J 7/0014* (2013.01); *H02J 9/02* (2013.01); *H02J 2207/20* (2020.01)

(58) Field of Classification Search
CPC ........ H02J 2310/42; H02J 7/14; H02J 7/0014; H02J 2207/02; H02J 2310/46; H02J 9/02; B60R 16/033
See application file for complete search history.

(56) References Cited

U.S. PATENT DOCUMENTS 6,148,258 A   11/2000  Bolsvert
6,239,996 B1 *  5/2001  Perreault ............... H02M 7/217
                                                    363/37
(Continued)

OTHER PUBLICATIONS

Mastervolt, Mastervolt Powerbook, Jul. 11, 2014, pp. 64-65 and 136-139, USA.
(Continued)

*Primary Examiner* — Jared Fureman
*Assistant Examiner* — Esayas G Yeshaw
(74) *Attorney, Agent, or Firm* — Gardner, Linn, Burkhart & Ondersma LLP

(57) ABSTRACT

A secondary power system is configured to connect to a motor vehicle having a powertrain comprising an engine and a first alternator. The secondary power system includes a second alternator connected to the engine, one or more electro-chemical storage devices coupled to the second alternator and configured to be charged by the alternator, and one or more inverter chargers. The inverter chargers may operate in a first mode to provide AC power to loads on the vehicle or in a second mode to receive alternative power and charge the storage devices. In an embodiment, the secondary power system includes multiple storage devices each comprising at least one electro-chemical storage pack and a logic. The storage devices are interconnected by a junction box. The logics within each storage device may selectively disrupt power flow from the junction box upon detection of an error condition.

20 Claims, 5 Drawing Sheets

Related U.S. Application Data continuation of application No. 16/411,887, filed on May 14, 2019, now Pat. No. 11,018,520, which is a continuation of application No. 15/237,919, filed on Aug. 16, 2016, now Pat. No. 10,333,337.

(60) Provisional application No. 62/260,865, filed on Nov. 30, 2015.

(51) Int. Cl.
*H02J 7/00* (2006.01)
*H02J 7/14* (2006.01)
*H02J 9/02* (2006.01)

(56) References Cited

U.S. PATENT DOCUMENTS

| | | | |
|---|---|---|---|
| 6,992,348 | B2 | 1/2006 | Kleint |
| 7,535,116 | B2 | 5/2009 | Daigle |
| 8,427,083 | B2 | 4/2013 | Warmenhoven |
| 8,525,492 | B2 | 9/2013 | Peterson |
| 8,627,914 | B2 | 1/2014 | Berbari |
| 9,126,544 | B2 | 9/2015 | Larson |
| 9,610,824 | B2 | 4/2017 | Allen |
| 10,906,408 | B2 | 2/2021 | Song |
| 11,190,026 | B2 | 11/2021 | Le et al. |
| 2002/0070556 | A1 | 6/2002 | Patel et al. |
| 2005/0002140 | A1 | 1/2005 | Borrego Bel et al. |
| 2011/0080040 | A1* | 4/2011 | Kumar ............... B60L 1/02 |
| | | | 290/16 |
| 2012/0074777 | A1 | 3/2012 | Sugiyama |
| 2013/0119665 | A1* | 5/2013 | Berbari ............... B60L 58/20 |
| | | | 290/50 |
| 2013/0249468 | A1 | 9/2013 | Bajjuri |
| 2013/0249469 | A1 | 9/2013 | Pahlevaninezhad |
| 2014/0361611 | A1 | 12/2014 | Saint-Leger et al. |
| 2015/0274025 | A1 | 10/2015 | Demure |
| 2016/0089992 | A1 | 3/2016 | Le et al. |
| 2016/0138550 | A1 | 5/2016 | Kirlew et al. |
| 2016/0152146 | A1 | 6/2016 | Adra et al. |
| 2016/0176534 | A1 | 6/2016 | Himmelmann et al. |
| 2017/0305283 | A1* | 10/2017 | Huh ............... H02P 27/08 |
| 2018/0354437 | A1 | 12/2018 | Dixon et al. |

OTHER PUBLICATIONS

Roadtrek, Inc., Owner's Manual E-trek, 2014 copyright notice.
Roadtrek, Inc., Owner's Manual E-Option Supplement, 2014 copyright notice.
Excerpt of online forum thread titled "Dual alternators, why or why not . . . ", webpage <https://www.classbforum.com/forums/f5/dual-alternators-why-or-why-not-3082.html>, 1 page, date retrieved from Internet unknown.
Online forum thread titled "Dual alternators, why or why not . . . ", webpage <https://www.classbforum.com/forums/f5/dual-alternators-why-or-why-not-3082.html>, 12 pages, retrieved from Internet on Dec. 29, 2021.
A Systems Approach to Lithium-Ion Battery Management by Phillip Weicker, published 2014.
Mastervolt Powerbook Brochure, published 2014.
Alpha Systems Catalog entitled Charge regulators and alternators: For rapidly recharged batteries, published 2014.

* cited by examiner

SECONDARY POWER SYSTEM

CROSS-REFERENCE TO RELATED APPLICATIONS

This application is a continuation of U.S. patent application Ser. No. 17/328,659 filed on May 24, 2021, now U.S. Pat. No. 11,855,478, which is a continuation of U.S. patent application Ser. No. 16/411,887, now U.S. Pat. No. 11,018,520, filed on May 14, 2019, which is a continuation of U.S. patent application Ser. No. 15/237,919, now U.S. Pat. No. 10,333,337, filed on Aug. 16, 2016 and entitled "SECONDARY POWER SYSTEM", which claims the benefit of U.S. Provisional Patent Application Ser. No. 62/260,865 filed Nov. 30, 2015 and entitled "SECONDARY POWER SYSTEM," all of which are hereby incorporated herein by reference in their entirety.

FIELD OF INVENTION

The present invention generally relates to power systems for vehicles, such as large commercial and recreational vehicles and vessels where large amounts of electrical energy are required to operate auxiliary power systems.

BACKGROUND

In recent years, designs for large vehicles have advanced and become more sophisticated and complex. Land vehicles such as recreational vehicles (RVs) and busses have grown in size, complexity, and the number of features that they offer. Likewise, water vehicles, such as yachts and other boating vehicles, have also evolved to provide larger living spaces, more technology, and improved heating, air conditioning, refrigeration, lighting, and entertainment options for users.

While these features improve the comfort and functionality of the vehicles for users, they also come at a cost, specifically with respect to power consumption. Traditionally, recreational vehicles have strived to provide users with the same luxuries as a stationary home, but most auxiliary power solutions suffer from numerous limitations. For example, the power systems for these type of vehicles have used external engine powered generators, apart from the main drive engine, to supply the electrical energy require to operate the devices needed by the operator. The generator engines range in size of 2 kilowatts to 50+ kilowatts and they consume considerable space, add large amounts of weight to the vehicles and create considerable amounts of emissions. Further complicating the addition of generators, EPA Generation IV diesel rules are currently being applied to use of generators, which further drives up the cost, complexity, and size of generators and increases reliability issues. Relying on the main engine as a primary source of power, however, is not an effective solution due to its inefficiency in powering the nominal loads and the common use of 12V as the primary operating voltage of engine systems. In other systems, batteries have been used as a secondary power source. However, the weight, size, and life expectancy of traditional batteries prevent them from being the core auxiliary power components for vehicles.

For many years, the standard operating voltage for most vehicles has been 12 volts DC, which is also the default or standard for most platforms globally. Batteries, computers, starter motor, lighting, and all of loads have been developed for mobile platforms. The limitation of 12 volts DC, however, is based in physics defined as Ohm's law and electrical work.

Ohms law: $V=I*R$

Where V=volts, I=Amps, and R=Resistance. Electrical work is defined as:

$W=V*A$

Where W=Watts, V=Volts, and A=Amps.

To power a device of any type it requires work to be done, in this case electrical work or watts. For large tasks more work is required. For example assume a vessel requires 8,000 watts to operate all of its systems. If you were to provide that power using 12 volts the amperage (or current) required to deliver that amount of work would 667 amps which is an extremely large number and is not practical due to electrical losses and safety.

One solution to deal with the high current levels is to increase the voltage. By increasing the voltage, the same amount of power could be provided at a much lower amperage. However, higher voltages bring additional regulations and requirements. Any voltage above 60 volts DC is classified as a high voltage application by the Federal Energy Regulatory Commission (FERC) and the North American Electric Reliability Corporation (NERC). When working with voltages above 60 volts DC there are multiple regulations and safety consideration that add cost and complexity. These additional restrictions increase liability and require specially trained personal to maintain such systems. In most applications the mobile transportation systems described above are maintained by the owners or work crew that operate the vehicle for the tasks it was designed for and not necessary trained for high voltage work. Therefore it is advantage to the owners and operators of the vehicles to have electrical systems that are safe for them to maintain at lower voltages.

These larger power high voltage systems are often integrated into the original vehicle platform. When integrated into the vehicle architecture the computer system, controls, software, and mechanical items are rigidly integrated limiting the options that can be done to the vehicle by the Recreation Vehicle Manufacturer or the Commercial Vehicle manufacturer. The commercial and recreation vehicle manufacturers' traditionally design their vehicles around a mass produced platform either an engine or a complete drivetrain from a larger volume equipment manufacturer. They then construct the specialized vehicle components and accessories around the base platform. Due to the complexity and liability of the high voltage integrated solutions the up fitting manufacturer cannot utilize or adapt these integrated system into their platforms without significant research and expense.

Another approach for powering auxiliary systems has been to use AC (alternating Current) generators which operate at the same voltages and wave forms as most home systems. In North America the standard is 120V at 60 Hertz. Using a generator allows the manufacturer and operators to use commonly available appliances that run on 120 V AC and tools which reduces complexity and cost. The limitations on these types of generators is the regulation quality of the wave form. As shown in FIG. 1A, the power delivered to our homes are well regulated 60 hertz cycles. Generators, however, do not have the same capabilities as large power facilities are susceptible to variation which causes incomplete and often damaging wave forms to appliances and electronics, as shown in FIG. 1B.

While many small volume manufacturers desire to develop auxiliary power systems and add on hybridization systems that are uniquely customized to their vehicle or system, the cost and complexity of developing such systems makes them unattainable. A cost competitive, scalable, and customizable third party hybrid solution that easily integrates with existing power solutions would solve this need.

Accordingly, an improved secondary power system that is scalable, customizable, and integratable with existing power solutions is needed in the industry.

SUMMARY

A secondary power system is generally presented. The secondary power system is configured to connect to a motor vehicle having a powertrain comprising an engine and a first alternator. The secondary power system includes a second alternator, separate from the first alternator, interconnected to a moving or rotational portion of the engine to drive the second alternator. One or more electro-chemical storage devices are coupled to the second alternator and configured to be charged by the alternator when it is driven by the engine.

One or more inverter/chargers are connected to the one or more electro-chemical storage devices and switchable between a first mode and a second mode. In a first mode, the one or more inverter/chargers are configured to receive DC power from the one or more electro-chemical storage devices and convert the DC power to AC power. In a second mode, the one or more inverter/chargers are configured to receive AC power from an alternative power source and provide a DC power output to charge the one or more electro-chemical storage devices.

In an embodiment, the secondary power system includes a first storage device comprising at least one electro-chemical storage pack and a logic and a second storage device comprising at least one electro-chemical storage pack and a logic. The first storage device logic is configured to monitor the first storage device and other components within the secondary power system for an error condition. The second storage device logic is configured to monitor the second storage device and other components within the secondary power system for an error condition. The secondary power system further includes a junction box including an input power bus configured to transmit power to and from the first and second storage devices, an output power bus configured to transmit power to and from one or more inverter/chargers, and a junction box control relay configured to relay power between the input power bus and the output power bus. The junction box control relay is configured to break the power connection between the input power bus and the output power bus when an error condition is detected by either the first storage device logic or the second storage device logic.

BRIEF DESCRIPTION OF THE DRAWINGS

The operation of the invention may be better understood by reference to the detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

A power generation system 10 is generally presented. The power generation system 10 may be an auxiliary or secondary power system configured to provide power to devices and components on a vehicle or within a system, such as on a recreational vehicle ("RV"), bus, boat, or the like. The power generation system 10 may operate in conjunction with or to supplement a primary power system 12 on a vehicle.

The power generation system 10 may provide a plug and play auxiliary power solution for gas engine powered vehicles. The power generation system 10 may couple to a an existing power system, such as a gas powered engine, at a single point and be sufficient to provide power for all auxiliary systems on the vehicle. The power generation system 10 may specifically be designed to handle all types of loads that are typical on large specialized vehicles.

Figure 1A:
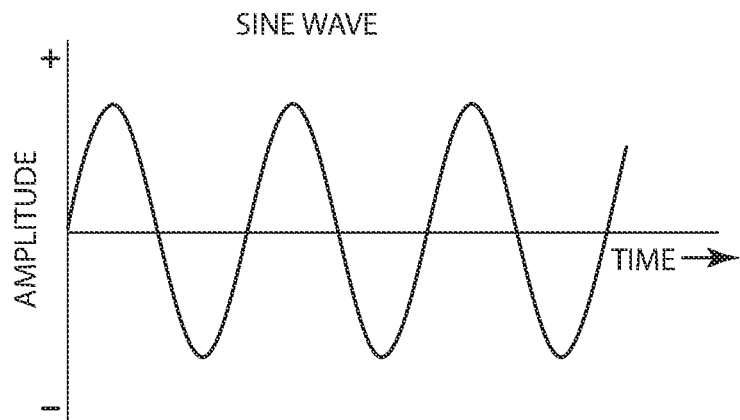
FIG. 1A illustrates a standard or ideal AC waveform.
Figure 1B:
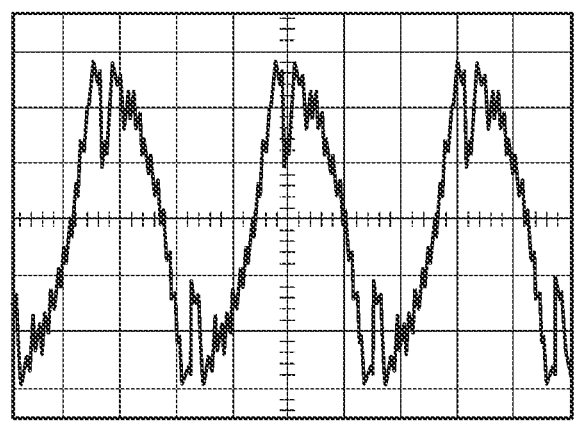
FIG. 1B illustrates a harsh wave form from a gas a diesel generator.
Figure 2:
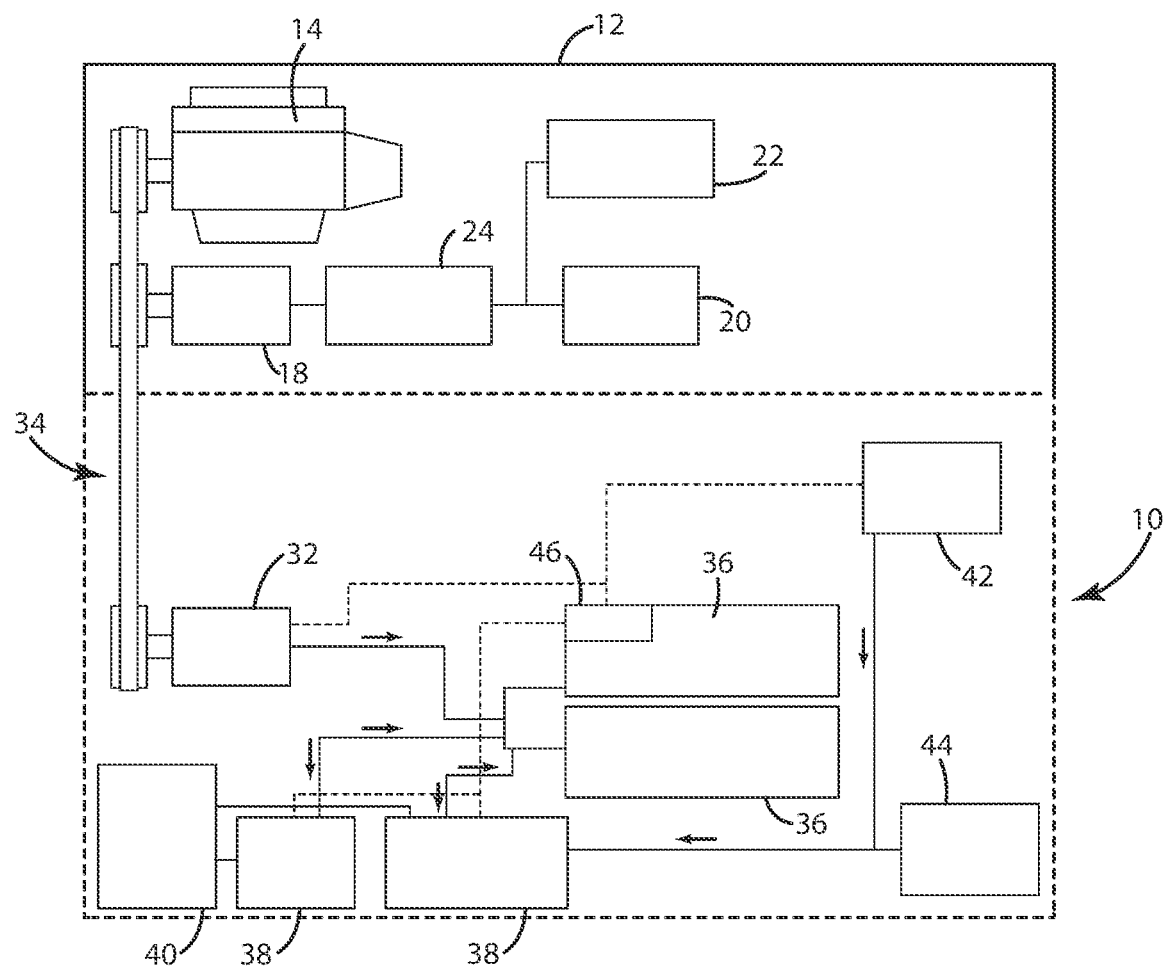
FIG. 2 illustrates a system diagram for the primary and secondary power systems of a vehicle.

FIG. 2 illustrates a power generation system 10 in communication with a primary power system 12 of a vehicle. The primary power system 12 may be connected to or comprise a vehicle engine. 14. The vehicle engine 14 may be any appropriate type and size of engine, such as a gas or diesel engine, or the like. The engine 14 may drive the powertrain systems of the vehicle, such as the wheels of a land vehicle or the propeller of a watercraft.

As with many automotive vehicles, the engine 14 may be configured to drive the primary electric power system 12 of the vehicle, which may then provide power to the devices on board the vehicle. For example, the engine 14 may be mechanically coupled to an alternator 18, such as a twelve (12) volt alternator. The engine 14 may drive a belt that spins the alternator 18 to generate electrical current. The alternator 18 may power a battery 20, such as a twelve (12) volt battery. The battery may then provide electric power to electrical loads 22 onboard the vehicle. It will be appreciated that the primary electric power system 12 may include additional components, such as a charge regulator 24 to limit the rate at which the battery 20 is charged or drained.

The power provided by the primary electrical power system 12 may be insufficient to drive all of the components on the vehicle. Specifically, when the vehicle is not moving and the engine is not running, the battery 20 may lack sufficient power to drive the onboard systems. Further, some vehicles may include 120 volt AC loads that may be difficult to power with the 12 volt battery, even with power inverters. In such cases, a secondary power system may be needed to provide additional on board power.

As illustrated in FIG. 2, the vehicle may include a secondary power system 10 coupled directly to the vehicle engine 14. The secondary power system 10 may be configured to supply power above and beyond the primary power system 12 to meet the vehicle's power requirements. As described herein, the secondary power system 10 may include various components to absorb and distribute energy at a rate needed by the vehicle. The secondary power system 10 may be scalable or stackable to allow customization to meet a given vehicle's power needs.

The secondary power system 10 may operate at a primary voltage that reduces current draw as compared to traditional primary vehicle power systems, while still falling outside of high-voltage guidelines and requirements. For example, the secondary power system 10 may operate at a primary voltage greater than 12 volts and lower than 60 volts, such as 48 volts. By operating above the 12 volt level, the secondary power system 10 realizes the benefit of generating higher power with reduced current draw as compared to 12 volt systems. At the same time, by keeping the primary voltage below 60 volts, it allows the secondary power system 10 to avoid high voltage regulations. It will be appreciated, however, that the secondary power system 10 may operate on any appropriate primary voltage.

The secondary power system 10 may include an alternator 32. The alternator 32 may be distinct and separate from the primary vehicle alternator 18. The alternator 32 may generate electric power at the primary voltage of the secondary power system 10, such as 48 volts. As shown in FIG. 2, the alternator 32 may be directly connected to the engine 14 at a single point, such as coupled to a pulley on the engine by a coupling belt 34. The belt 34 may allow the engine to drive the alternator 34 and create the desired voltage. In an embodiment, the secondary power system 10 includes no other connection points or direct power exchange or flow or control interaction between the primary power system 12 and the secondary power system 10, other than the coupling belt 34 connected to the engine 14 and configured to drive the alternator 32. This arrangement provides a unique benefit of allowing the secondary power system 10 to be easily connected and disconnected from the vehicle at a single physical connection point. Further, it allows the system to be largely isolated, while still driven or charged, if needed, by the vehicle's primary powertrain.

The alternator 32 may be connected to and configured to charge one or more electro-chemical storage devices 36. The storage device 36 may be any appropriate type of electro-chemical storage devices, such as 48 volt lithium-ion storage devices. The storage devices 36 may be charged by the alternator while the vehicle engine 14 is running, as described in further detail below. In an embodiment comprising more than one storage device 36 the storage devices 36 may be connected in parallel, as shown in FIG. 2, or in any other appropriate configuration.

One or more inverter/chargers 38 may be connected to the storage devices 36. Although two inverter/chargers 38 are shown in FIG. 2, it will be appreciated that the secondary power system 10 may include any number of inverter/chargers 38, as needed to meet the system requirements. The inverter/chargers 38 may be connected in parallel to the electro-chemical storage devices 36, as shown in FIG. 2.

The inverter/chargers 38 may function in two different capacities, depending on the state of the system 10, power connections, power level, charge level, or other factors, as described in further detail below. Specifically, the inverter/chargers 38 may operate as power inverters and also as power chargers. In a first mode, the inverter/chargers 38 may operate as power inverters to convert the 48 volt DC signal into AC power, capable of powering any AC loads 40 onboard the vehicle. The AC loads 40 may include power outlets to power standard plug in devices, entertainment systems, heating and cooling systems, lighting, or any other primary or secondary devices or systems on the vehicle. The inverters 38 may convert the DC power to AC power and regulate the voltage to the appropriate level, such as 120 volts, to provide the appropriate power for the AC loads 40.

The inverter/chargers 38 may further operate in a second mode to charge the storage devices 36. Specifically, in some situations, alternative secondary power sources may be available to connect to the vehicle. Such secondary power sources may include a generator 42, such as a gas or diesel powered generator, or in some cases shore power 44. Shore power may include any type of docking or shore power that may be connected to a boat in a marina, or an RV or bus at a park, rest stop, or other location. The secondary power sources may provide sufficient power to power all of the AC loads 40 directly while connected to the vehicle. Further, while the vehicle is connected to a secondary power source, the inverter/chargers 38 may function to charge the storage devices 36 by providing power back to them. The chargers 38 may regulate the voltage and power signal from the secondary sources to provide the appropriate DC signal to charge the storage devices 36.

The secondary power system 10 may include a controller 46 to monitor the system and direct operation of the components and the flow of power between the components. When the vehicle is in use and the engine 14 is running, the 48 volt alternator 32 may charge the electro-chemical storage devices 36, which may provide power to the inverter/chargers 38. The controller 46 may direct or enable the inverter/chargers 38 to function as inverters and convert the 48 volt DC signal to an AC power signal, such as 120 volt AC signal, used to power the AC loads 40. When the engine 14 is cut off, the electro-chemical storage devices 36 may continue to power the AC loads 40 through the inverter/chargers 38. The controller 46 may monitor the charge level of the storage devices 36 to determine when additional power from an on board generator 42 may be required to supplement or replace the power from the storage devices 36. When the charge level of the storage devices 36 gets too low, the controller 46 may direct the inverter/chargers 38 to function as chargers to the storage devices 36 with power received from the generator 42. Likewise, when the vehicle is plugged into shore power, the controller may direct the inverter/chargers 38 to charge the storage devices 36 while also providing the appropriate power signal to the AC loads 40.

Figure 3:
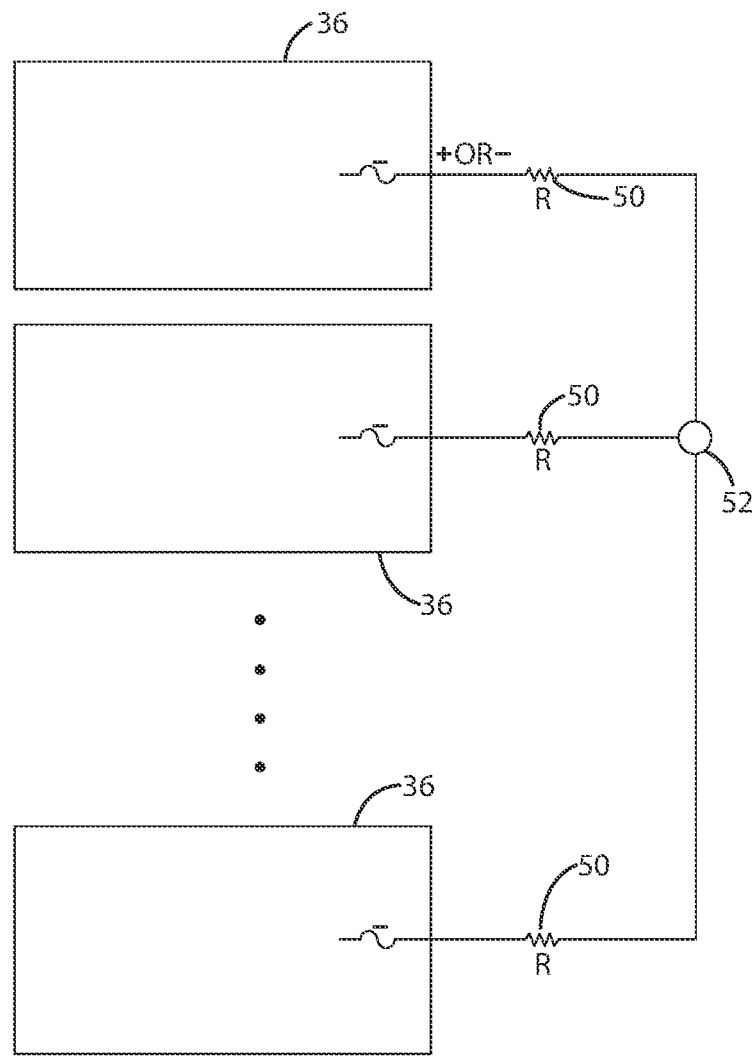
FIG. 3 illustrates a system diagram for a secondary power system having a balancing circuit.
Figure 4:
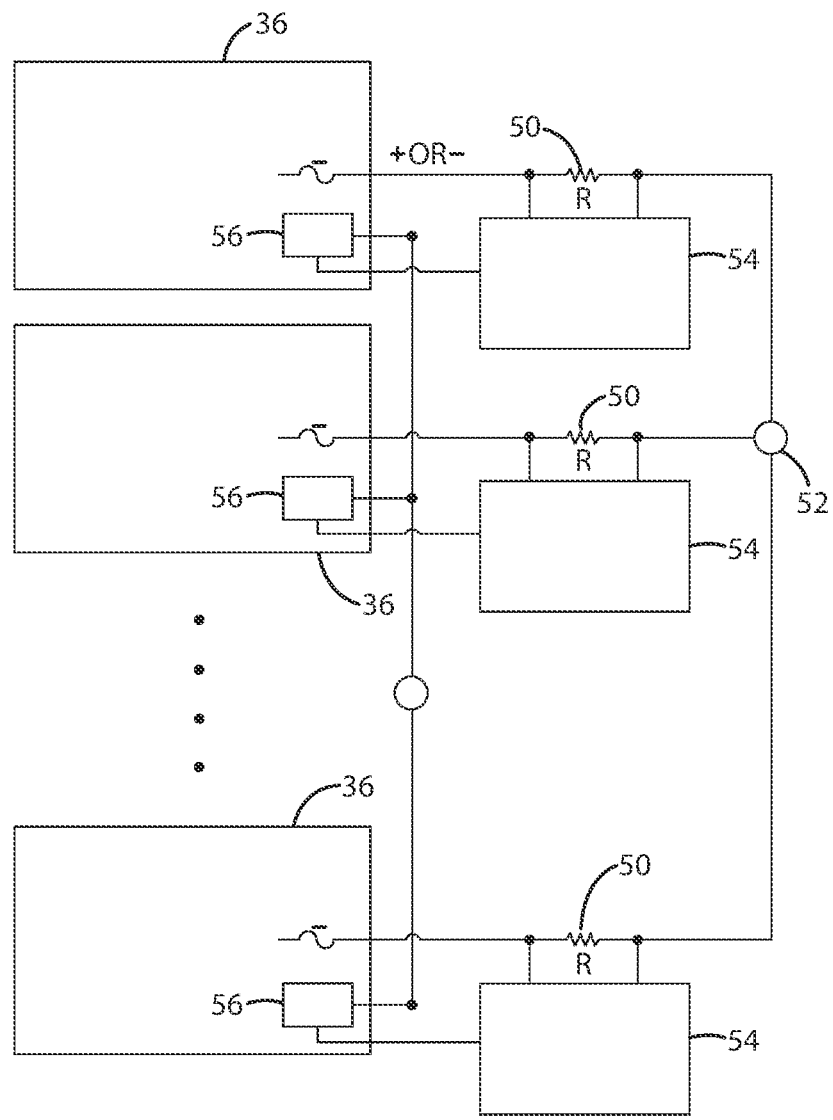
FIG. 4 illustrates a system diagram for a secondary power system having a balancing and monitoring circuit.

In an embodiment illustrated in FIGS. 3 and 4, the secondary power system 10 may include a balancing circuit integrated with the various storage devices 36. The balancing circuit may serve to maximize the longevity and durability of the storage devices 36 and to protect against unwanted current flow between the storage devices 36 and damage to the storage devices 36. As illustrated in FIG. 3, the balancing circuit may be passive, including one or more resistors 50. The circuit may be configured to draw energy, as heat, from storage devices 36 that have a greater charge than other storage devices 36 within the system. By drawing out energy from storage devices 36 with more energy than other storage devices 36, the balancing circuit will level the energy between each storage device and ensure that each device is drained equally and consistently supplies the desired voltage.

As illustrated in FIG. 3, the storage devices 36 may be connected in a star configuration, all connecting back to a single node 52. The resistors 50 may be positioned between the node 52 and either the positive or negative lead of each storage device 36. The configuration and placement of resistors 50 may serve to balance the voltage output of each storage device 36. Specifically, the resistors 50 may be equal in size to regulate and equalize the current flow from each storage device 36 and prevent current flow between storage devices 36. The resistors 50 may be located internal or external to each storage device 36.

In an embodiment illustrated in FIG. 4, the secondary power system 10 may include an imbalance monitoring circuit to check for an imbalanced condition. The imbalance monitoring circuit may include a sensor 54, such as a voltage sensor, located at each resistor 50. The sensor 54 may monitor the voltage across each resistor 50. The imbalance monitoring circuit may compare the voltages to determine if there is an imbalanced condition. An imbalanced condition may occur when the difference in voltage across any two resistors is greater than a predetermined threshold.

Each sensor 54 may be tied as an input back to the controller 46 to allow the controller 46 to monitor the storage devices 36 for an imbalanced condition. The controller 46 may also control a relay or contact 56 positioned in line with the main positive or negative lead for the storage device 36. Opening the relay 56 disrupts the current flow from the storage device 36 and prevents damage to the storage devices 36 or other system components. The controller 46 may monitor the sensors 54 for an imbalanced condition and open the relay 56 when an imbalanced condition is detected.

Figure 5:
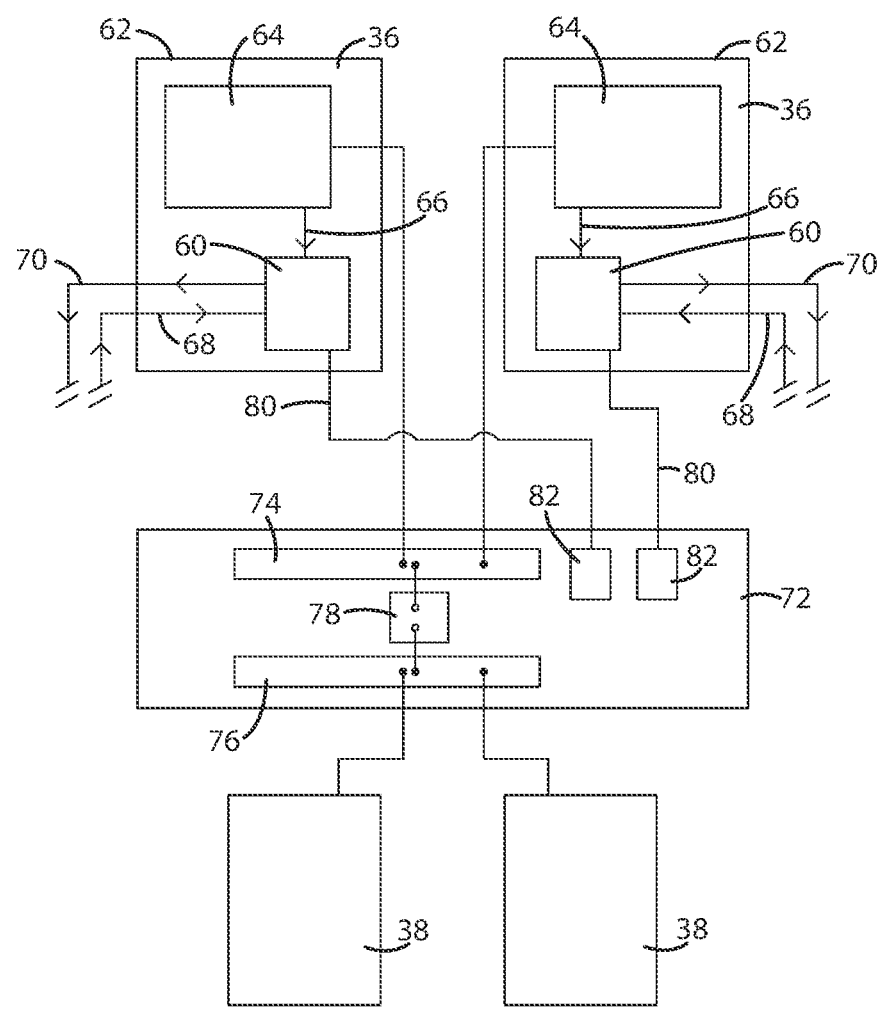
FIG. 5 illustrates a system diagram of a secondary power system having a plurality of storage devices connected to a junction box.

In an embodiment, the storage devices 36 may be configured and designed to be stackable, scalable, and modular in order to provide custom power solutions for any vehicle. As shown in FIG. 5, the storage devices 36 may each comprise a unitary body with a plurality of components contained within. As opposed to other battery designs that are simple passive devices, the storage devices 36 may include an internal logic 60, such as a controller 46 and/or other devices, integrated within each unit. The controller 46 may monitor power conditions within the storage device 36 and conditions within the secondary power system 10 as a whole, as described in further detail below, to allow multiple storage devices to be coupled or stacked and provide a customized power solution without risking damage to the storage devices 36 or system 10.

The storage device 36 may comprise a case 62 to enclose the internal components of the device. The case may house the components of the storage device, as described below, to allow multiple units to be easily added or removed from the system 10.

Each storage device 36 may include one or more electro-chemical storage packs 64. The electro-chemical storage packs 64 may be lithium ion packs or any appropriate type of battery or power storage pack. The storage packs 64 may generate the desired voltage, such as a DC voltage between 12 and 60 volts.

The logic 60 may include various components, including a controller 46, relays, and other devices to implement the desired control. The logic 60 may communicate with both components within its respective case 62 as well as other components of the system 10. For example, the logic 60 may receive internal input signals 66 from within the storage device to monitor the power drain, charge capacity, and other conditions of the storage device 36. The logic 60 may further receive external input signals 68 from components within the system 10. For example, the logic 60 may receive input signals from the inverter/chargers 38 to monitor whether the inverter charters are receiving power from an alternative source, monitor the quality of power received at the inverter/chargers 38, as well as other conditions within the inverter/chargers 38.

The logic 60 may further include output signals 70 to components of the secondary power system 10. For example, the logic 60 may transmit output signals 70 to the inverter/chargers to enable or disable them from charging the storage devices 36 or drawing power from the storage devices.

In an embodiment illustrated in FIG. 5, the secondary power system 10 may include two or more storage devices 36. When combining multiple batteries or power storage devices of any kind in parallel, however, there are inherent risks to both the storage devices and the system as a whole. For example, if one storage device 36 drains at a different rate than other storage devices 36, then there is a risk of creating current flow between the devices and damaging them. Accordingly, the secondary power system 10 must monitor for these type of error conditions and take preventative measures when such conditions are detected.

As shown in FIG. 5, the secondary power system 10 may include a junction box 72. The junction box 72 may receive power from the first and second storage devices 36 and selectively allow power to flow between the storage devices 36 and the inverter/chargers 38.

The junction box 72 may include an input power rail 74 and an output power rail 76. The input power rail 74 may receive power from the storage devices 36 and the output power rail 78 may connect to the inverter/chargers 38. A controllable logic may be positioned between the input and output power rails 74, 76 to selectively disable power flow between the storage devices 36 and the inverter/chargers 38 upon detection of an appropriate error condition. For example, the junction box 72 may include a junction box relay 78. The junction box relay may be configured to relay power between the input and output power rails 74, 76. The junction box relay 72 may be controlled by the logic 60 from each of storage devices 36. For example, each logic 60 may provide an enable signal 80 to the junction box relay 78. When the enable signal from any logic 60 is removed, the junction box relay 72 may open and prevent power from flowing between the input and output power rails 74, 76.

In an embodiment, the junction box 72 may include one or more voting relays 82. The number of voting relays 82 may correspond to the number of storage devices 36. Specifically, the logic 60 from each storage device 36 may control a voting relay 82 within the junction box 72. Each voting relay 82 supplies an enable or voting signal to the junction box relay 72. When any one of the voting relays 82 removes its enable signal, the junction box relay 72 will open and disrupt the flow of power between the input and output power rails 74, 76.

As discussed herein, an error condition may be any type of error detected by the logic in the status of the storage device 36 or other components of the system 10. This may include, but not be limited to, unbalanced draining between storage devices 36, fully charged or over charged conditions of the storage devices 36, unqualified power at the inverter/chargers 38, or other error conditions. It will be appreciated that the logic 60 may utilize other means of responding to the error condition other than cutting the junction box relay 72 to disrupt the power flow between the input and output power rails 74, 76. For example, if unqualified power is detected at an inverter/charger 38, the logic 60 may send an output signal 70 to the inverter/charger 38 to perform a soft shutdown, and may subsequently shut down other components of the system 10. This type of response may be preferred over a harsh power disconnect.

The secondary power system 10 may be connected to a motor vehicle powertrain 12 to provide hybridization or additional power function and capability. The secondary power system 10 may be added to an existing motor vehicle 12 as an after-market addition, such as connecting to the existing powertrain of a vehicle. As described above, the secondary power system 10 may be connected at a single point mechanical connection, such as between the alternator 32 and the engine 14. The secondary power system 10 may be scalable to meet the power needs of the vehicle, such as by adding or removing storage devices 36 to customize the power capabilities to those of the vehicle.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, we claim:

1. A secondary power system for providing auxiliary power to a motor vehicle having an internal combustion engine, a battery, and a first alternator, the first alternator configured to recharge the battery, the secondary power system comprising:
   a plurality of electro-chemical storage devices that are each configured for storing a charge, wherein each of the electro-chemical storage devices comprise a plurality of electro-chemical storage packs;
   a case within which the electro-chemical storage devices are contained;
   a second alternator, the second alternator configured to be coupled to the engine and to be selectively operated to charge the electro-chemical storage devices;
   an electronic power device operable as a power inverter coupled to the electro-chemical storage devices and configured to receive a DC voltage from the electro-chemical storage devices and convert the DC voltage to an AC voltage and to provide the AC voltage to AC loads at the vehicle; and
   a controller communicatively coupled to the electro-chemical storage devices, the controller configured to monitor the charge levels of the electro-chemical storage devices and based upon the monitoring is further configured to determine when the electro-chemical storage devices require charging and to direct operation of the second alternator for charging of the electro-chemical storage devices based on the controller determining that the electro-chemical storage devices require charging, wherein the controller is communicatively coupled to the power inverter, and wherein the controller enables operation of the electro-chemical storage devices to provide a DC voltage to the power inverter.

2. The secondary power system of claim 1, wherein the controller is configured to transmit output signals to the power inverter to enable or disable the power inverter from drawing power from the storage devices.

3. The secondary power system of claim 1, wherein the controller is at the case.

4. The secondary power system of claim 3, wherein the controller is disposed within the case.

5. The secondary power system of claim 1, further comprising an electronic power device operable as a power charger, wherein the power charger is configured to receive AC power from an alternative power source and provide a DC power output to charge the electro-chemical storage devices.

6. The secondary power system of claim 5, wherein the electronic power device operable as a power inverter and the electronic power device operable as a power charger are integrated to comprise an inverter/charger.

7. The secondary power system of claim 5, wherein the controller is configured to transmit output signals to the power charger to direct operation of the power charger and enable or disable the power charger from charging the electro-chemical storage devices.

8. The secondary power system of claim 7, wherein the alternative power source is a generator or shore power.

9. The secondary power system of claim 1, wherein the plurality of storage packs of each of the electro-chemical storage devices comprise lithium-ion storage packs.

10. The secondary power system of claim 9, wherein the controller is configured to monitor the charge of each of the plurality of storage packs.

11. The secondary power system of claim 1, wherein the first alternator operates at a first alternator operating voltage and the second alternator operates at a second alternator operating voltage that is higher than the first alternator operating voltage.

12. The secondary power system of claim 1, wherein the electro-chemical storage devices comprise 48-volt electro-chemical storage devices, wherein the second alternator comprises a 48-volt alternator, and wherein the first alternator comprises a 12-volt alternator.

13. The secondary power system of claim 1, further comprising a relay electrically disposed between the electro-chemical storage devices and the power inverter, wherein the controller is communicatively coupled with the relay and is configured to selectively open the relay to prevent power from flowing between the electro-chemical storage devices and the power inverter.

14. The secondary power system of claim 13, wherein the controller is configured to open the relay upon detecting an error condition.

15. A secondary power system for providing auxiliary power to a motor vehicle having an internal combustion engine, a battery, and a first alternator, the first alternator configured to recharge the battery, the secondary power system comprising:
   a plurality of electro-chemical storage devices that are each configured for storing a charge, wherein each of the electro-chemical storage devices comprise a plurality of electro- chemical storage packs;
   a case within which the electro-chemical storage devices are contained;
   a second alternator, the second alternator configured to be coupled to the engine and to be selectively operated to charge the electro-chemical storage devices;
   an electronic power device operable as a power inverter coupled to the electro-chemical storage devices and configured to receive a DC voltage from the electro-chemical storage devices and convert the DC voltage to an AC voltage and to provide the AC voltage to AC loads at the vehicle; and a controller communicatively coupled to the electro-chemical storage devices, the controller configured to monitor the charge levels of the electro-chemical storage devices and based upon the monitoring is further configured to determine when the electro-chemical storage devices require charging and to direct operation of the second alternator for charging of the electro-chemical storage devices based on the controller determining that the electro-chemical storage devices require charging, wherein the controller is communicatively coupled to the power inverter, and wherein the controller enables operation of the electro-chemical storage devices to provide a DC voltage to the power inverter;

wherein the controller is configured to transmit output signals to the power inverter to enable or disable the power inverter from drawing power from the storage devices, and wherein the controller is at the case.

16. The secondary power system of claim 15, further comprising an electronic power device operable as a power charger, wherein the power charger is configured to receive AC power from an alternative power source and provide a DC power output to charge the electro-chemical storage devices, and wherein the controller is configured to transmit output signals to the power charger to direct operation of the power charger and enable or disable the power charger from charging the electro-chemical storage devices.

17. The secondary power system of claim 16, wherein the electronic power device operable as a power inverter and the electronic power device operable as a power charger are integrated to comprise an inverter/charger.

18. A method for providing auxiliary power with a secondary power system to a motor vehicle having an internal combustion engine, a battery, and a first alternator that is configured to recharge the battery, where the secondary power system comprises:
   a plurality of electro-chemical storage devices that are each configured for storing a charge, wherein each of the electro-chemical storage devices comprise a plurality of electro-chemical storage packs;
   a case within which the electro-chemical storage devices are contained;
   a second alternator, the second alternator configured to be coupled to the engine and to be selectively operated to charge the electro-chemical storage devices; and
   an electronic power device operable as a power inverter coupled to the electro-chemical storage devices and configured to receive a DC voltage from the electro-chemical storage devices and convert the DC voltage to an AC voltage and to provide the AC voltage to AC loads at the vehicle;

said method comprising:
monitoring the charge levels of the electro-chemical storage devices with a controller communicatively coupled to the electro-chemical storage devices;
determining with the controller when the electro-chemical storage devices require charging based upon said monitoring; and
directing by the controller operation of the second alternator for charging of the electro-chemical storage devices based on the controller determining that the electro-chemical storage devices require charging;
wherein the controller is communicatively coupled to the power inverter, and wherein the method further comprises enabling the electro-chemical storage devices via the controller to provide a DC voltage to the power inverter.

19. The method of claim 18, further comprising transmitting output signals from the controller to the power inverter for enabling or disabling the power inverter from drawing power from the storage devices.

20. The method of claim 18, wherein the secondary power system further comprises an electronic power device operable as a power charger, wherein the power charger is configured to receive AC power from an alternative power source and provide a DC power output to charge the electro-chemical storage devices, and
wherein the method further comprises transmitting output signals from the controller to the power charger to direct operation of the power charger by enabling or disabling the power charger from charging the electro-chemical storage devices.

* * * * *